United States Patent [19]

Somers

[11] Patent Number: 4,814,918
[45] Date of Patent: Mar. 21, 1989

[54] MULTITRACK MAGNETIC HEAD HAVING MAGNETICALLY COUPLED TRANSDUCER ELEMENTS

[75] Inventor: Gerardus H. J. Somers, Eindhoven, Netherlands

[73] Assignee: U.S. Philips Corporation, New York, N.Y.

[21] Appl. No.: 55,660

[22] Filed: May 28, 1987

[30] Foreign Application Priority Data

May 29, 1986 [NL] Netherlands ......................... 8601371

[51] Int. Cl.$^4$ ........................ G11B 5/127; G11B 5/33
[52] U.S. Cl. ................................................. 360/113
[58] Field of Search ............. 360/113, 116; 338/32 R; 324/252

[56] References Cited

U.S. PATENT DOCUMENTS

| 3,887,944 | 6/1975 | Bajorek et al. | 360/113 |
| 4,556,925 | 12/1985 | Suenaga et al. | 360/113 |
| 4,673,998 | 6/1987 | Sonda et al. | 360/113 |

FOREIGN PATENT DOCUMENTS

| 0217220 | 12/1984 | Japan . | |
| 0255525 | 11/1986 | Japan | 360/113 |
| 2064849 | 6/1981 | United Kingdom . | |
| 2109992 | 6/1983 | United Kingdom . | |

OTHER PUBLICATIONS

Gestel et al., "Read Out of a Magnetic Tape by the Magnetoresistive Effect", Phillips Tech. Review 37, 1977, No. 2/3, pp. 42–50.

Primary Examiner—Stuart N. Hecker
Assistant Examiner—David J. Severin
Attorney, Agent, or Firm—F. Brice Faller

[57] ABSTRACT

Elongate magneto-resistive elements (3) spaced apart on a substrate (9) incorporated in a magnetic circuit constituted by a magnetic yoke (5, 7, 9) which is provided with pole faces (19, 21) for the purpose of co-operating with the registration medium, while each magneto-resistive element is provided with two contacts (3A) for connection to a measuring current source. To improve the stability of the magneto-resistive elements, the magnetic head has strip-shaped coupling elements (17) which magnetically couple the magneto-resistive elements and keep them electrically separated from each other.

5 Claims, 1 Drawing Sheet

MULTITRACK MAGNETIC HEAD HAVING MAGNETICALLY COUPLED TRANSDUCER ELEMENTS

BACKGROUND OF THE INVENTION

The invention relates to a magnetic head for detecting magnetic fields representing information on a relatively movable magnetic registration medium the magnetic head, includes a substrate on which a number of juxtaposed elongated magneto-resistive elements are provided which are each incorporated in a magnetic circuit constituted by a magnetic yoke which is provided with pole faces for the purpose of co-operating with the registration medium. Each magneto-resistive element is provided on two oppositely located edge portions with contacts for connection to a measuring current source.

A multitrack magnetic head of this type is known from British Patent No. 2,064,849 The known magnetic head has a number of spatially separated transducer elements of the magneto-resistive type and a plane surface for magnetic flux coupling of the transducer elements with a magnetic medium. To this end a layerwise formed pattern defining a number of magneto-resistive elements is provided on a common substrate, whilst the magneto-resistive elements are connected to contact faces by means of connection conductors. The magneto-resistive elements co-operate with discrete magnetic layers of the pattern formed from a number of discrete magnetic layers for defining the transducer elements.

As is known from Philips Technical Review 37, pages 42–50, 1977, no. 2/3, the elongated magneto-resistive elements will preferably have such a magnetic anisotropy that the magnetically preferred direction coincides with the longitudinal axis of the magneto-resistive element. For the purpose of linearising the magnetic head one or more oblique conducting strips may be provided on one of the plane surfaces of the separate magneto-resistive elements, preferably at an angle of 45° with the longitudinal axis of the magneto-resistive element. These strips function as equipotential strips so that the direction of the current in the magneto-resistive elements constitutes an angle with the magnetically preferred direction.

Magnetic heads of the type described above are suitable for use in devices for industrial application with magnetic discs, drums or tapes as well as in consumer electronics, such as digital and analogue audio recorders.

It has been found that the known multitrack magnetic head is less suitable for detecting magnetic media which are provided with a number of juxtaposed very narrow tracks. This is related to the fact that as the track width is smaller, the length of the magneto-resistive elements must also be taken to be smaller in connection with the track density, thus creating a more unfavourable length/width ratio regarding the magnetic shape anisotropy of the magneto-resistive elements. This means that instabilities in the magneto-resistive elements may be produced during operation of the magnetic head, with domain walls being displaced in an unpredictable way and with troublesome noise phenomena occurring.

SUMMARY OF THE INVENTION

It is an object of the invention to improve the magnetic head described so that the magnetic head can be used without any instability problems for reading a magnetic registration medium having a great track density and whose tracks only have a small track width. Another object is to provide a magnetic head having a long lifetime.

To achieve the above objects the magnetic head is provided with strip-shaped coupling elements of a magnetically permeable material for coupling the magneto-resistive elements in a soft magnetic manner and keeping them electrically separated. Each coupling element bridges the distance between two adjacent magneto-resistive elements and covers the facing edge portions of the magneto-resistive elements.

By magnetically connecting the magneto-resistive elements, a composite element of great length having a very favourable magnetic shape anisotropy so that an optimum stability of the separate magneto-resistive elements is ensured. The electrical decoupling of the separate magneto-resistive elements provides a better channel separation and therefore reduces the risk of crosstalk between the separate magneto-resistive elements. Each magneto-resistive element may be connected to a separate amplifier for further pressing the detected information, which gives the magnetic head more possibilities of use than with the use of differential amplifiers, certainly in applications in which not all magneto-resistive elements have to be utilised. If the magneto-resistive elements were not electrically isolated from each other, series-arranged differential amplifiers would have to be used, which has the drawback that the lifetime of the magnetic head ends if one of the magneto-resistive elements becomes defective.

The magneto-resistive elements and the coupling elements will be preferably manufactured from the same soft magnetic material, for example, an Ni-Fe-based alloy. It has been found that it is favourable to provide the coupling elements with extremities which are rounded off. In fact, the occurrence of domain walls which are stuck in the vicinity of straight corners, also referred to as "pinning points" can be prevented thereby. Pinning points may give rise to distortion and noise of the output signals of the magnetic head. For the same reason the edge portions of the magneto-resistive elements will also be preferably rounded off.

It is to be noted that a magnetic head with magneto&-resistive sensors is described in U.S. Pat. No. 3,887,944 in which for the purpose of avoiding crosstalk a flux coupling between adjacent sensors is prevented by forming the magnetic sensors on a strip of a magneto-resistive material, whilst the sensors are mutually magnetically decoupled by local deactivation of parts of the strip. Otherwise this known magnetic head is of a type whose sensors are in direct contact with the magnetic medium to be read.

For the sake of completeness reference is made to JP No. 56-156922 in which a magnetic head with a magnetic reluctance effect is shown in which a soft magnetic material is provided in the vicinity of magnetic reluctance elements for the purpose of adjusting a bias field. This known magnetic head is of a completely different type than the magnetic head according to the invention.

The magnetic head can have insulation layers of an electrically insulating material, which layers are provided at the area of the edge portions between the magneto-resistive elements and the coupling elements. In that case it is favourable to manufacture the magnetic head by means of a thin-film technique, whilst the insulation layer preferably consisting of quartz can be selectively structured with respect to the other parts of the magnetic head.

DETAILED DESCRIPTION OF THE INVENTION

Figure 1:
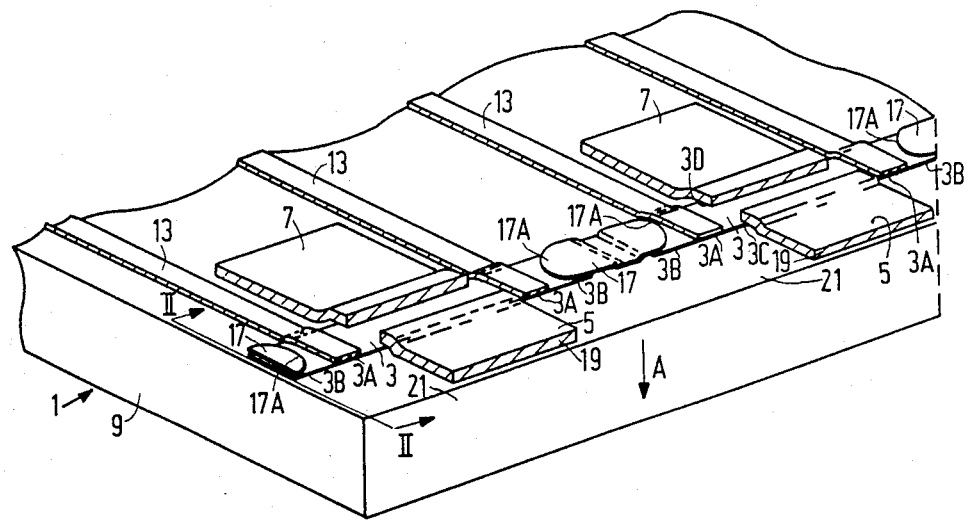
FIG. 1 diagrammatically shows a part of the magnetic head according to the invention in a perspective view and FIG. 2 is a cross-section taken on the line II—II in FIG. 1.
Figure 2:
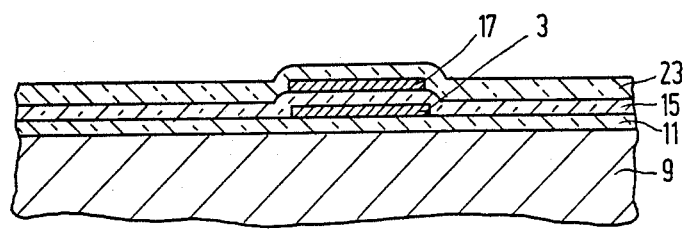

The inventive multitrack magnetic head 1 shown in the drawing is used to detect magnetic fields originating from a multitrack magnetic registration medium such as a magnetic tape which is moved along the magnetic head in the direction of the arrow A shown. Detection takes place by measuring the relative resistance changes of magneto-resistive elements 3 integrated in the magnetic head which receive magnetic flux via magnetically permeable parts 5, commonly referred to as flux collect guides, whilst magnetically permeable parts 7, commonly referred to as flux return guides are used to return the magnetic flux.

The magnetic head according to the invention may be manufactured as a multilayer thin-film structure provided on a substrate. Standard sputtering and photo-etching techniques can be used to realise the multilayer structure. The starting material may be a ferrite magnetic substrate 9 on which a first insulation layer 11 of electrically insulating material such as $SiO_2$ is provided.

The structure further comprises a number of spatially separated layers of a magneto-resistive material such as $Ni_{20}Fe_{80}$ constituting the said elongated magneto-resistive elements 3. Electric conductors 13 of, for example, Au which are present to connect the magneto-resistive elements 3 to a current source are electrically connected to the magneto-resistive elements 3 at the area of contact faces 3A. A second electric insulation layer 15 of quartz is provided on the magneto-resistive elements, which layer also extends at least in part across the first insulation layer 11. The magneto-resistive elements 3 are magnetically interconnected by means of layers of a soft magnetic material such as an NiFe alloy-based layer, for example, $Ni_{20}Fe_{80}$ further referred to as coupling elements 17 deposited on the electric insulation layer 15 which has a thickness of, for example, 0.15 $\mu$m. The strip-shaped coupling elements 17, which have a thickness of, for example, 0.06 $\mu$m, have a length which is larger than the axial distance between the magneto-resistive elements so that the coupling elements 17 cover edge portions 3B of the magneto-resistive elements. The flux guides 5 and 7 already referred to which are constituted by layers of a material having a high magnetic permeability, for example, an NiFe alloy are pairwise spaced and cover edge zones 3C and 3D on one side of the magneto-resistive elements 3. The insulating layers 11 and 15 have holes, which are not visible in the drawing, at the area of the flux return guides 7 for the purpose of magnetically coupling the parts 7 to the magnetic substrate 9. The parts 5, the parts 7 and the substrate 9 together constitute a magnetic yoke having a number of pairs of pole faces 19 and 21 corresponding to the number of magneto-resistive elements, the pole faces 19 being provided on the parts 5 and the pole faces 21 being provided on the substrate 9. A protective layer 23 of an electrically insulating material may be provided on the coupling elements 17. For the sake of clarity the insulating layers 1, 15 and 23 are not shown in FIG. 1.

The invention is of course not limited to the embodiment shown and described. For example, it is not always necessary to provide the coupling elements 17 with extremities 17A which are rounded off. In addition the separate magneto-resistive elements 3 may be provided with oblique conducting strips for the purpose of linearisation, more specifically in a manner as extensively described in the aforementioned Philips Technical Review 37, pp. 42–50, 1977, no. 2/3.

What is claimed is:

1. A magnetic head for detecting magnetic fields representing information on a magnetic registration medium which is relatively movable with respect to the magnetic head, comprising a substrate on which a number of juxtaposed elongated magneto-resistive elements are provided which are each incorporated in a magnetic circuit constituted by a magnetic yoke which is provided with pole faces for the purpose of co-operating with the registration medium, each magneto-resistive element having two oppositely located edge portions provided with contacts for connection to a measuring current source, characterized in that the magnetic head is provided with strip-shaped coupling elements of a magnetically permeable material for coupling the magneto-resistive elements in a soft magnetic manner, each coupling element bridging the distance between two adjacent magneto-resistive elements and covering the edge portions facing each other, the head being further provided with means for electrically separating the coupling elements from the magneto-resistive elements, whereby the magneto-resistive elements exhibit good magnetic coupling while being electrically decoupled.

2. A magnetic head as claimed in claim 1, characterized in that the coupling elements are provided with extremities which are rounded off.

3. A magnetic head as claimed in claim 2, characterized in that means for electrically separating the coupling elements from the magneto-resistive elements comprises insulation layers of an electrically insulating material, which layers are provided at the area of the edge portions between the magneto-resistive elements and the coupling elements.

4. A magnetic head as claimed in claim 1, characterized in that means for electrically separating the coupling elements from the magneto-resistive elements comprises insulation layers of an electrically insulating material, which layers are provided at the area of the edge portions between the magneto-resistive elements and the coupling elements.

5. A magnetic head as claimed in claim 4 in which the magnetic head is manufactured by means of a thin-film technique, characterized in that the coupling elements are formed from an Ni-Fe-based alloy and the insulation layers are formed from quartz.

* * * * *